United States Patent [19]
Kaplinsky et al.

[11] Patent Number: 5,822,222
[45] Date of Patent: Oct. 13, 1998

[54] MULTI-WAVELENGTH IMAGING PYROMETER

[75] Inventors: Michael B. Kaplinsky, South Orange; Walter F. Kosonocky, Skillman; Nathaniel J. McCaffrey, Clifton, all of N.J.

[73] Assignee: New Jersey Institute of Technology, Newark, N.J.

[21] Appl. No.: 417,668

[22] Filed: Apr. 5, 1995

[51] Int. Cl.$^6$ .................................. G01J 5/62; G01J 5/00
[52] U.S. Cl. .............................. 364/557; 374/9; 374/124; 374/130; 374/137; 356/45; 250/316.1; 250/339.01; 250/339.02; 250/339.04
[58] Field of Search ....................... 364/550, 557, 364/578; 374/9, 121, 123, 124, 128, 130, 137; 356/43, 45; 250/316.1, 338.1, 339.01, 339.02, 339.04

[56] References Cited

U.S. PATENT DOCUMENTS

| | | | |
|---|---|---|---|
| 4,413,324 | 11/1983 | Tatsuwaki et al. | 364/557 |
| 4,980,847 | 12/1990 | Hirano | 364/557 |
| 5,114,242 | 5/1992 | Gat et al. | 374/128 |
| 5,132,922 | 7/1992 | Kahn et al. | 364/557 |
| 5,159,199 | 10/1992 | LaBaw | 250/339.02 |
| 5,165,796 | 11/1992 | Gat et al. | 374/128 |
| 5,329,353 | 7/1994 | Ichimura et al. | 356/328 |

*Primary Examiner*—Emanuel T. Voeltz
*Assistant Examiner*—Edward Pipala
*Attorney, Agent, or Firm*—Henry I. Schanzer

[57] ABSTRACT

An apparatus and method for non-contact real-time measurements of temperature and emissivity profiles of radiant targets with unknown spectral emissivity. The selected points or regions on the radiant target are imaged onto an array of photodetectors through an assembly of narrow-band optical filters. Produced multi-wavelength images of the radiant target are processed by the computer workstation and 1D or 2D temperature and emissivity profiles are obtained by means of the curve-fitting of radiometric model of imager sensor response to measured response and performing spatial interpolation of the results. Method for calibration of said apparatus by means of curve-fitting of radiometric model of the apparatus to sensor responses obtained by imaging pre-calibrated blackbody. Method for compensation for inherent non-linearities of pyrometer response.

22 Claims, 14 Drawing Sheets

MULTI-WAVELENGTH IMAGING PYROMETER

FIELD OF THE INVENTION

This invention relates to a multi-wavelength imaging pyrometry (M-WIP) for remote real-time sensing of temperature profiles of radiative targets with unknown spectral emissivity.

BACKGROUND OF THE INVENTION

The non-contact radiometric temperature measurements are based on the detection and analysis of thermal radiation emitted by an object. The underlying idea of all radiometric techniques is based on the concept of the blackbody radiator which is defined as an ideal surface that emits more thermal radiation than any other surface at the same temperature. The thermal emission of real objects can be described by the surface emissivity, $\epsilon$, which is defined as the ratio of radiation emitted by the real surface to that emitted by the blackbody at the same temperature.

In general, in order to infer the temperature of the target from the measurement of emitted radiation, the value of the surface emissivity, $\epsilon$, should be known. Therefore, in the situations where the emissivity of the target is changing rapidly, or the conditions of the process preclude the independent measurements of target emissivity, the conventional radiometric methods will not yield the true temperature.

An extensive study of the radiometric literature shows that there exists a wide variety of methods designed to circumvent the problem of unknown emissivity. Some of these methods (e.g. ratio radiometry) provide satisfactory results if certain usually rather restrictive assumptions about the spectral emissivity of the target are met. Other methods (referred to as multi-wavelength radiometry) require more extensive measurements but provide acceptable results without placing substantial restrictions on the shape of the spectral emissivity curve.

Emissivity Independent Multi-Wavelength Pyrometer is discussed in U.S. Pat. No. 5,132,922 issued to Khan et al. However, the multi-wavelength pyrometer apparatus discussed in the referenced patent is only suitable for single-valued measurement of the average temperature of part of the target that occupies the field of view of the detector apparatus. The referenced discussion does not address the method and apparatus for non-contact measurement of the temperature profiles (distribution) on the target surface. The discussion presented in U.S. Pat. No. 5,132,922 does not consider the method for calibration of the pyrometer apparatus. The referenced discussion also does not consider the method of compensation for the inherent non-linearities of pyrometer response to the incident radiation, which is critical for accurate real-time non-contact temperature measurements over wide range of target temperatures. The above mentioned limitations of the referenced patent are addressed by the teachings of our patent.

SUMMARY OF THE INVENTION

This invention includes an apparatus for non-contact measurements of temperature and emissivity profiles of radiant target with unknown spectral emissivity comprising: an assembly of multiple narrow-band optical filters, an array of photodetectors sensitive to the transmission bands of the optical filters, optical means for imaging the radiant target through an assembly of multiple narrow-band optical filters on an array of photodetectors for producing multi-wavelength images of the radiant target; an array of photodetectors sensitive to the main transmission bands of the optical filters, and means for processing the detected multi-wavelength images of the radiant target using a model of the radiant target for determining the temperature and emissivity profiles on the surface of the radiant target.

The apparatus, to be referred to as Multi-Wavelength Imaging Pyrometer (M-WIP), includes assembly of narrow-band optical filters and optics, image sensor (camera), and a computer workstation. In one embodiment of this apparatus an assembly of striped narrow-band optical filters is positioned in front of the focal plane array (FPA) of an image sensor. In this case the spherical lens is employed for focusing of the image of the radiant target on the narrow optical slit. The image of the target area defined by the slit is then refocused on the FPA using cylindrical lens. As the result the image of the line on the target surface is "spread" across an array of striped IR filters in one direction while it is focused on the FPA in another direction.

In another embodiment an additional cylindrical lens may be used to magnify in the image of the target area defined by the slit, in the direction perpendicular to the slit opening, and to project it on the array of striped filters.

In another embodiment the rotating filter wheel is used to measure the spectra of the target radiation one wavelength at a time. This embodiment utilizes spherical optics to image the target on the array of photodetectors and allows two-dimensional sensing of temperature and emissivity profiles on the target.

In yet another embodiment the individual distinct filter is associated with each photodetector (or group of photodetectors). This embodiment utilizes spherical optics to focus the image of the target on the array of photodetectors and allows for two-dimensional sensing of temperature and emissivity profiles on the target.

In still another embodiment a fiber-optic assembly is used for measurement of temperature and emissivity profiles on the surfaces obscured from direct observation by opaque objects. In this embodiment the fiber bundles with radiation collection optics are used to deliver the thermal radiation from the target surface to individual optical filters of the filter assembly.

In still another embodiment the individual fibers equipped with radiation collecting optics are used to collect thermal radiation from the target surface. The cylindrical optics is then utilized to "spread" the output of individual fibers in one direction across an assembly of narrow-band striped optical filters and to refocus the image of each fiber on the photodetectors in another direction.

In another "point-sensing" embodiments of M-WIP the described above optical means for imaging the radiant target through an assembly of multiple narrow-band optical filters on an array of photodetectors are used in conjunction with one-dimensional array of individual photodetectors instead of image sensor FPA.

In another embodiment the values of the peaks of the filter transmissions are individually attenuated in order to provide approximately equal detected signal at all wavelengths at target temperature corresponding to the middle of the expected temperature range of measurements. The attenuation of the optical filters in this manner partially compensates for the spectral variations in the detected signal levels and, therefore, reduces the requirements on the dynamic range of an image sensor.

In another embodiment an image sensor is equipped with electronic control of optical integration time. The variable optical integration time allows to accommodate wide dynamic range of optical signals characteristic of pyrometric applications. In this embodiment the value of the optical integration time may be digitally encoded in the video signal for facilitation of M-WIP computations.

In another embodiment the computer workstation is adapted to apply to the detected signal compensations for non-linearities of the image sensor response. In this embodiment the applied signal corrections may include subtraction of the pre-stored background from the detected signal, subtraction of the dark current charge from the detected signal with photodetector-by-photodetector compensation for dark current variation as function of the detected signal level, compensation for saturation-type non-linearity of image sensor response based on the pre-stored characterization of this non-linearity as function of the detected signal level and the intensity of the incident radiative flux. In another, simplified embodiment, the compensation for saturation-type non-linearity of image sensor response may be expressed as function of the detected signal only.

In another embodiment the computer workstation is adapted to apply to the detected signal the compensation for low frequency variations in the power supply voltages which affect the long term stability of the camera response. In another embodiment the computer workstation is also adapted to perform temporal noise reduction by spatial and/or temporal averaging of the detected signal In another embodiment the workstation is adapted for operation in two modes—calibration and real-time non-contact temperature measurements. In the calibration mode the computer workstation is adapted to employ calibration algorithm based on the curve-fitting technique, such as least-squares fit, for photodetector-by-photodetector evaluation of the effective values of peak transmissions and center wavelengths of optical filters based on the detection of thermal radiation emitted by the pre-calibrated blackbody source over a wide range of source temperatures. In the temperature measurement mode the computer workstation is adapted for evaluation of temperature and emissivity profiles on the target surface based on the curve-fitting, such as least-squares fit, of the theoretical signals given by the radiometric model of a sensor response to the values of target radiance measured at N distinct wavelength for each of several spatial points on the target.

The radiometric model of image sensor response consists of the product of two models: the model of an image sensor spectral response to the incident radiative flux multiplied by the model of the spectral radiance of the target surface. The model of an image sensor spectral response to the incident flux is given by the product of spectral responsivity of the sensor and the correction coefficient which depends on the effective transmission of the optical system, geometry of the detector, and the optical integration time. This correction coefficient is evaluated using developed by Coates (see P. B. Coates, "Wavelength Specification in Optical and Photoelectric Pyrometry," Metrologia, 13, 1, 1977) reference wavelength method based on the description of the spectral transmission of narrow-bandpass filter in terms of the moments of its spectral transmittance about the reference (mean or center) wavelength of the filter. The model of the spectral radiance of the target is given by the product of the radiance of the blackbody radiator (described by the Planck's equation) and the model of the spectral emissivity of the target.

In another embodiment the model of the target spectral emissivity is given by a simple function of wavelength such as polynomial or exponential functions. In this embodiment, a number of pre-programmed emissivity models are considered at the beginning of the temperature measurement stage with final selection performed by so adapted computer workstation based on the quality of the least-squares fits of the radiometric models of sensor system (using emissivity models under consideration) to the experimental data (detected signals). In another embodiment, the particular selection of the spectral emissivity model is based on the available information about the target spectral emissivity.

In another embodiment the computer workstation represents multiprocessor system and is adapted for parallel signal processing. In this embodiment the evaluation of the temperature and emissivity at each point on the target surface is performed in parallel, thus increasing the speed of response of multi-wavelength imaging pyrometer.

In another embodiment, the single-processor computer workstation is used and temperature and emissivity at each target point are evaluated on a point-by-point basis consecutively.

In another embodiment the continuous temperature and emissivity profiles on the target are determined using interpolation techniques based on the temperature and emissivity values at points for which they were actually evaluated by curve-fitting of the sensor model to the measured data. In another embodiment the partial differential heat balance equation (describing radiative and conductive heat exchange within the target) is used to approximate the target temperature and emissivity for points at which these parameters were not directly evaluated based on the curve-fitting of the sensor model to the measured data. In another embodiment the polynomial interpolation is used for evaluation of continuous temperature and emissivity profiles.

In another embodiment the high speed real-time M-WIP temperature measurements are achieved by taking into account the past dynamics of the target temperature and emissivity as estimated based on the previous measurements. In this embodiment the acceleration of M-WIP computations is achieved by periodically substituting the curve-fit-based estimation of the target spectral emissivity with its prediction based on the past dynamics. Using thus predicted emissivity values, the target temperature is directly computed from single-wavelength measurement using the radiometric model of image sensor response. Using past dynamics and subjecting only the limited number of target points to the actual curve-fit-based M-WIP estimate, this embodiment yields fast multi-point estimates of target temperature and emissivity profiles.

DETAILED DESCRIPTION OF THE INVENTION

Figure 1A:
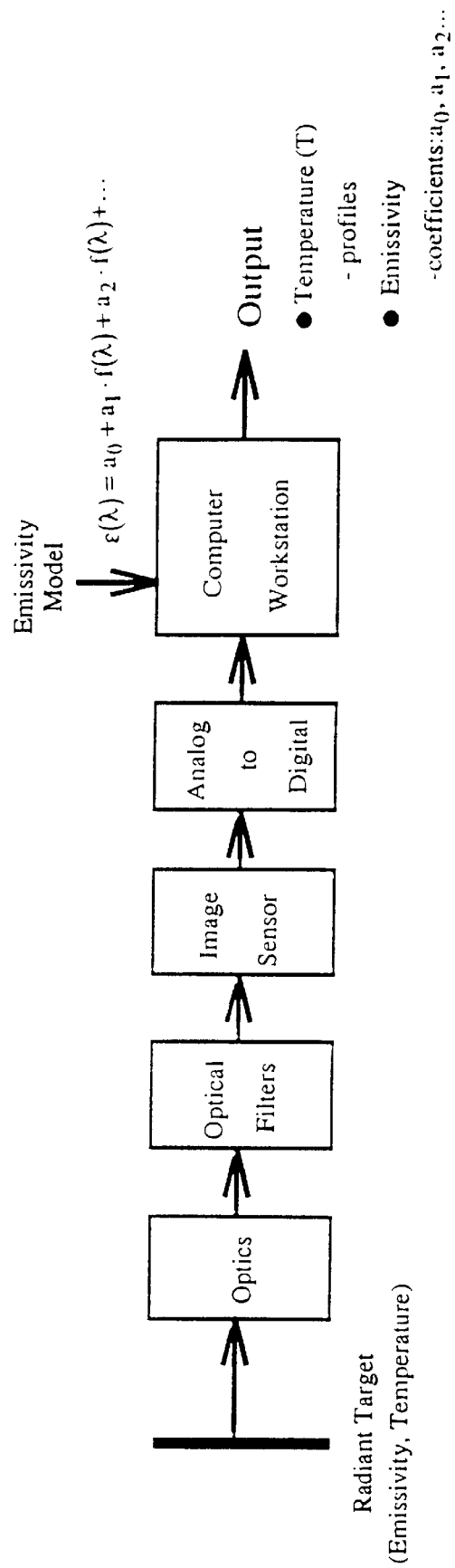
FIG. 1A illustrates a schematic diagram of the embodiment of Multi-Wavelength Imaging Pyrometer for the case, where optical filters are in close proximity of the array of photodetectors.
Figure 1B:
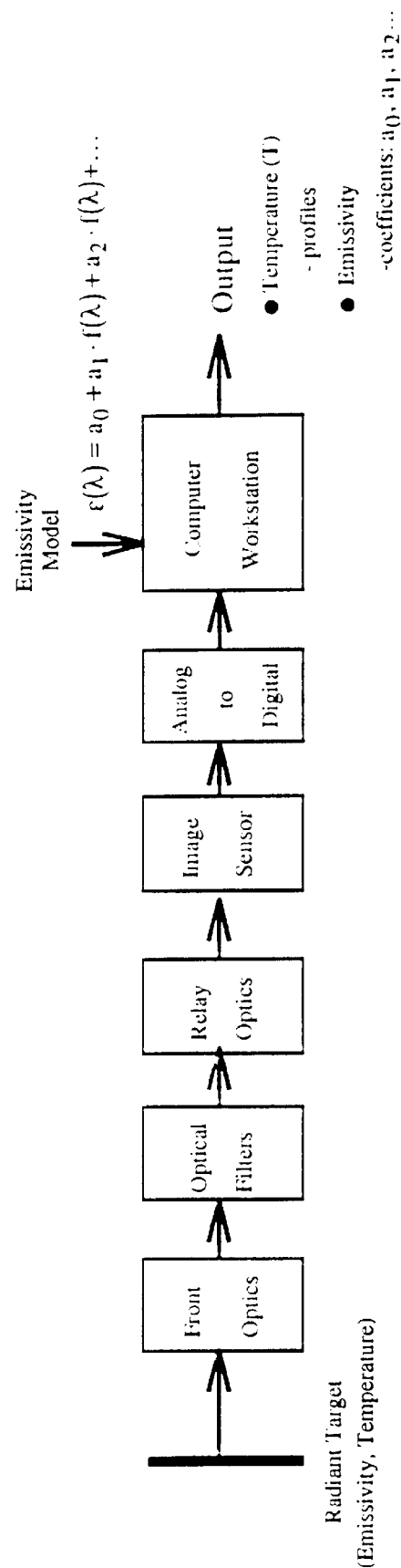
FIG. 1B illustrates a schematic diagram of the embodiment of Multi-Wavelength Imaging Pyrometer for the case, where target radiation focused on the optical filter assembly is refocused by means of relay optics onto array of photodetectors.

Block diagrams of two embodiments Multi-Wavelength Imaging Pyrometer (M-WIP) illustrating this invention are shown in FIGS. 1A and 1B. The Multi-Wavelength Imaging Pyrometer for non-contact real-time measurements of temperature and emissivity profiles of radiant targets with unknown spectral emissivity includes: an assembly of multiple narrow-band optical filters, an array of photodetectors sensitive to the transmission bands of the optical filters, optical means for imaging the radiant target through an assembly of multiple narrow-band optical filters on an array of photodetectors for producing multi-wavelength images of the radiant target; an array of photodetectors sensitive to the main transmission bands of the optical filters, and means for processing the detected multi-wavelength images of the radiant target using a model of the radiant target for determining the temperature and emissivity profiles on the radiant target. It should be noted that the difference between two embodiments illustrated in FIGS. 1A and 1B is that in the case illustrated in FIG. 1A the filters are in close proximity to the detectors, while in case illustrated in FIG. 1B the target radiation is refocused on the photodetectors by means of the relay lens.

Another aspect of the present invention is the method for calibrating Multi-Wavelength Imaging Pyrometer apparatus using curve-fit-based calibration algorithm design to yield effective spectral characteristics of the apparatus for each detector in each filter-detector combination utilized in the temperature measurements.

Yet another aspect of the present invention is the method non-contact real-time measurements of temperature profiles of targets with unknown spectral emissivity. This method includes an algorithm for determination of temperature profiles on the target based on the curve-fitting of the radiometric model of an image sensor to the values of target radiance measured at N distinct wavelengths for each of several spatial points on the target and utilizing these points for obtaining the continuous temperature profiles on the target by interpolation-based techniques. This aspect of the present invention also includes utilization of the system dynamics as inferred from the previously accumulated measurements to increase the speed of the M-WIP system response.

Still another aspect of this invention is the method of compensation for non-linearities of radiometric sensor response. This method includes subtraction of the pre-stored background from the detected signal, subtraction of the dark current charge (leakage) from the detected signal with photodetector-by-photodetector compensation for dark current (leakage) variation as function of the detected signal level, compensation for saturation-type non-linearity of radiometric sensor response based on the pre-stored characterization of this non-linearity as function of the detected signal level and the intensity of the incident on the photodetectors radiative flux.

Figure 2A:
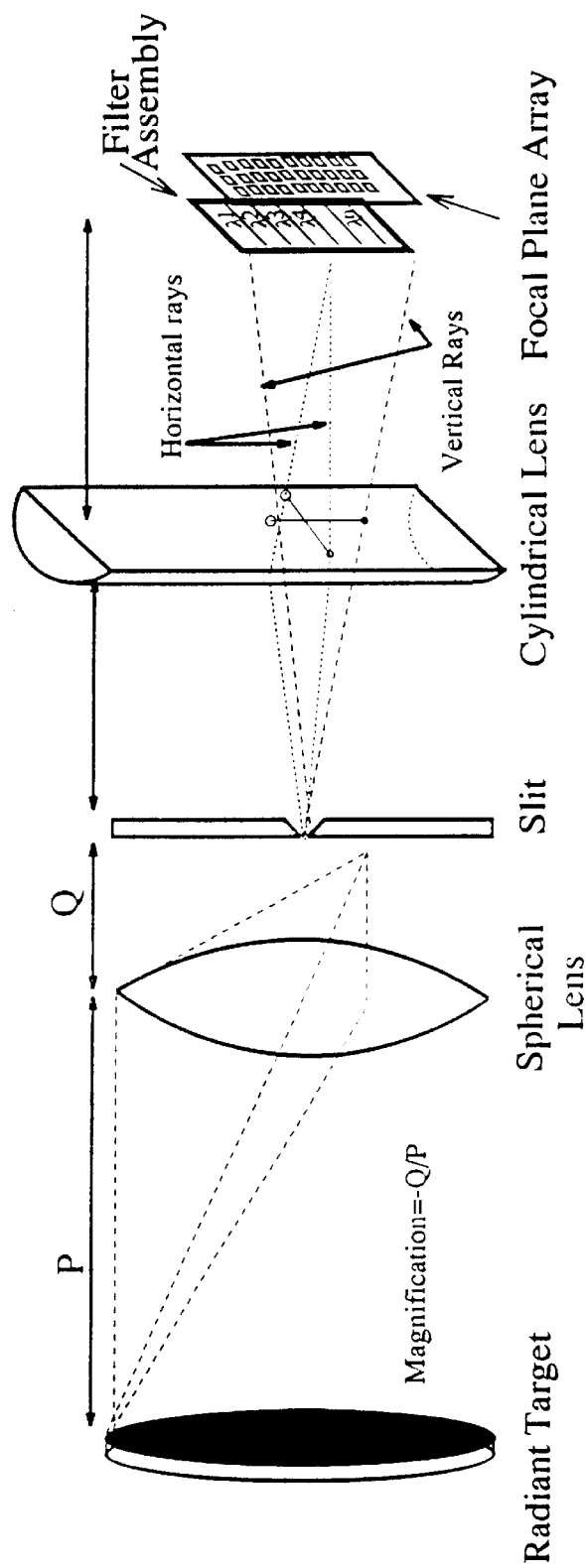
FIG. 2A illustrates the imaging of a line on the target onto an array of photodetectors through an array of narrow-band striped optical filters using one spherical and one cylindrical lens and an optical slit sensing temperature profile along the line on the target in accordance with the invention.

In its another embodiment, the Multi-Wavelength Imaging Pyrometer is equipped with "line-sensing" IR filter assembly. In this embodiment an assembly of striped narrow-band IR filters is in front of the focal plane array (FPA) of an image sensor. In this case the spherical lens is employed for focusing of the image of the radiant target on the narrow optical slit. The image of the target area defined by the slit is then refocused on the FPA using cylindrical lens as illustrated in FIG. 2A.

Figure 2B:
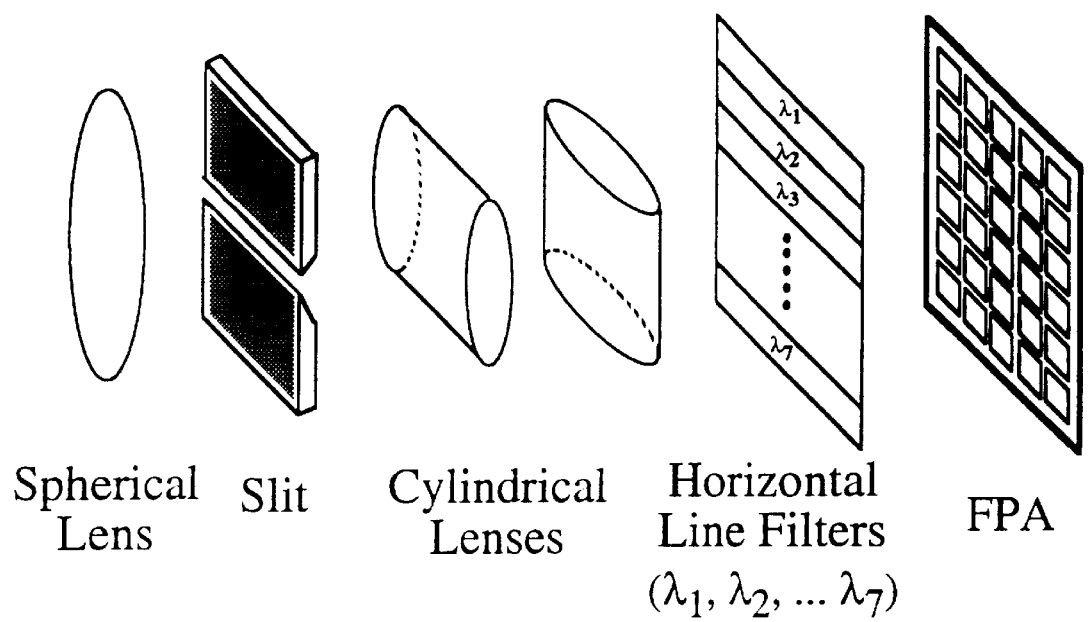
FIG. 2B illustrates the imaging of a line on the target onto an array of photodetectors through an array of narrow-band striped optical filters using one spherical and two cylindrical lenses and an optical slit for sensing temperature profile along the line on the target in accordance with the invention.

In another embodiment an additional cylindrical lens may be used to magnify the image of the target area defined by the slit, in the direction perpendicular to the slit opening, and to project it on the array of striped filters as illustrated in FIG. 2B.

Figure 3:
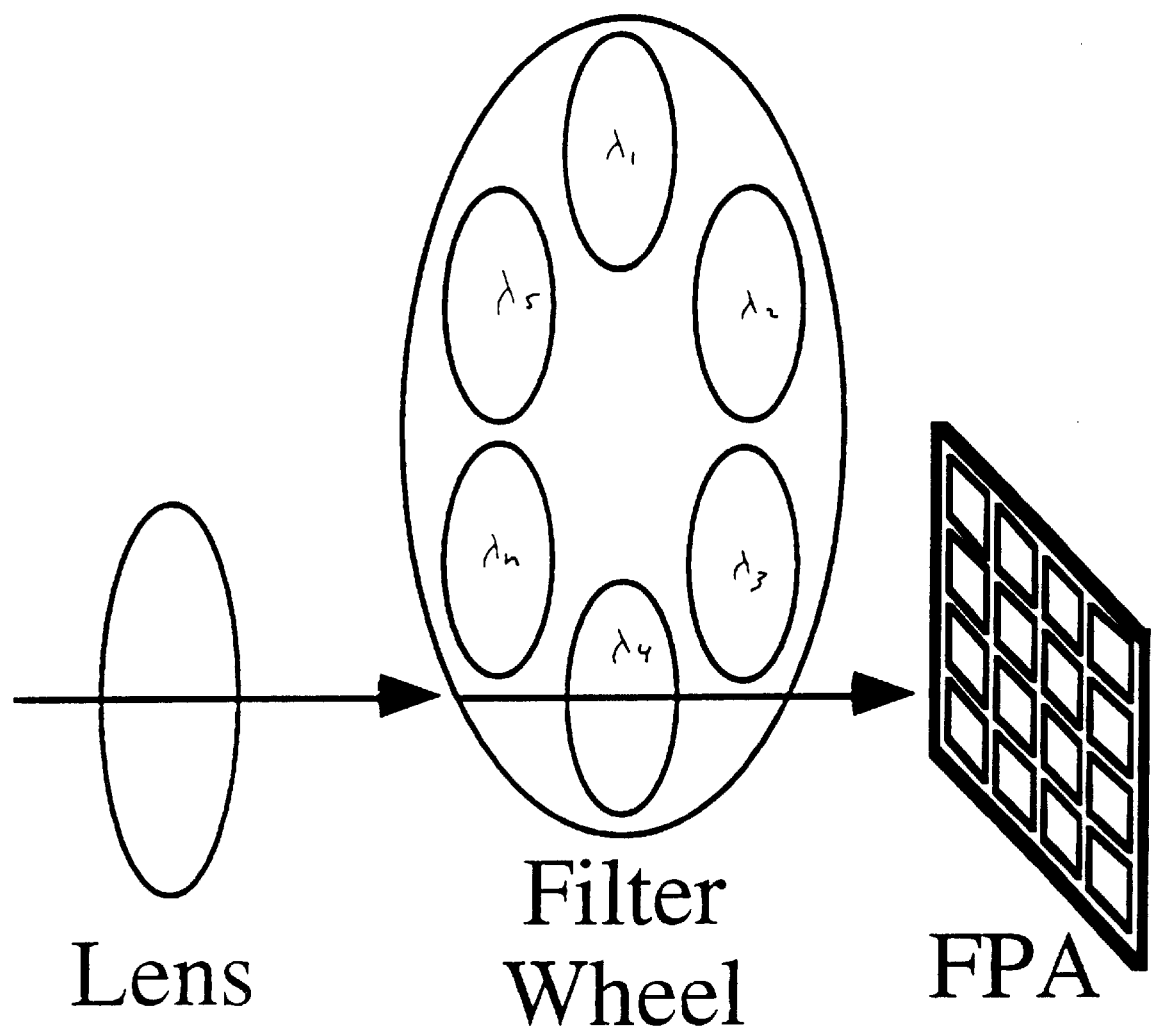
FIG. 3 illustrates optical filter assembly in the form of a rotating filter wheel for area sensing of the target temperature profiles in accordance with the invention.

In another embodiment the rotating filter wheel is used to measure the spectra of the target radiation one wavelength at a time as illustrated in FIG. 3. This embodiment utilizes spherical optics to image the target on the FPA and allows two-dimensional sensing of temperature and emissivity profiles on the target.

Figure 4:
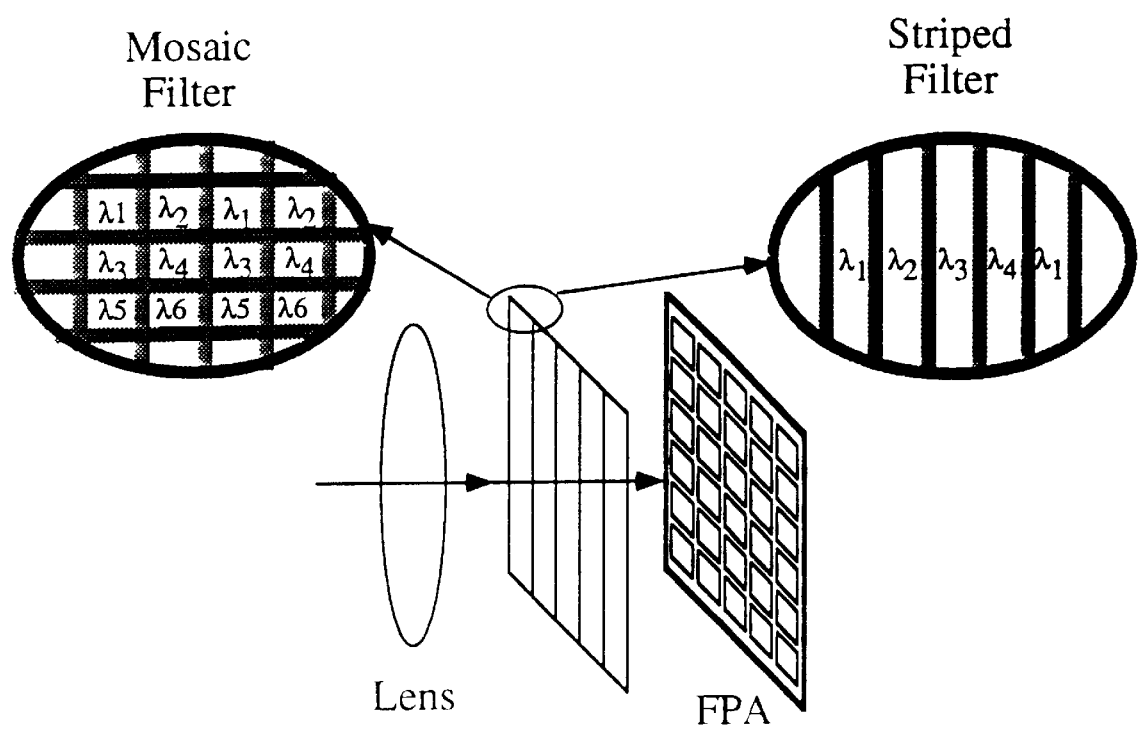
FIG. 4 illustrates mosaic and striped filter assemblies where macropixels of the image sensor comprise a set of n photodetectors with one-to-one correspondence to a set of n filters for area sensing of the target temperature profiles in accordance with the invention.

In yet another embodiment a set of n distinct filters is associated with each macropixel, where each macropixel is composed of n imager photodetectors. This embodiment, shown in FIG. 4, utilizes spherical optics to focus the image of the target on the FPA and facilitates two-dimensional sensing of temperature and emissivity profiles on the target surface.

Figure 5:
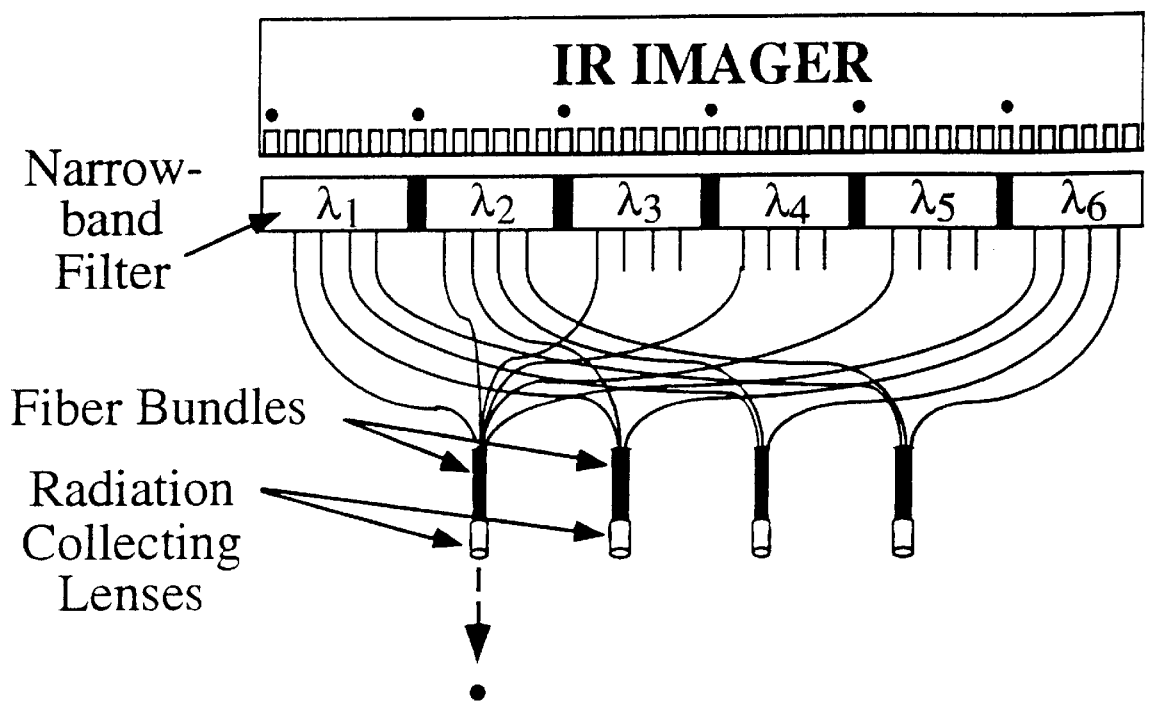
FIG. 5 illustrates fiber-optic assembly for sensing of temperature profiles in accordance with the invention on target obscured from the direct observation. This figure illustrates the case where m fiber-optic bundles containing n optical fibers each are used to image m target points on photodetectors through optical filters, where each fiber bundle transmits radiation from one of m target points to n optical filters.

In still another embodiment a fiber-optic filter assembly is used for measurement of temperature and emissivity profiles on the targets obscured from direct observation by opaque objects. As illustrated in FIG. 5, in this embodiment the fiber bundles with radiation collection optics are used to transmit the thermal radiation from the target to individual optical filters of filter assembly. In this case m fiber-optic bundles containing n optical fibers each are used to image m target points on m×n photodetectors through n optical filters, where each fiber bundle transmits radiation from one of m target points to n optical filters. It should be noted that larger number of detectors than m×n can also be used, with several detectors grouped together to produce a single output signal.

Figure 6:
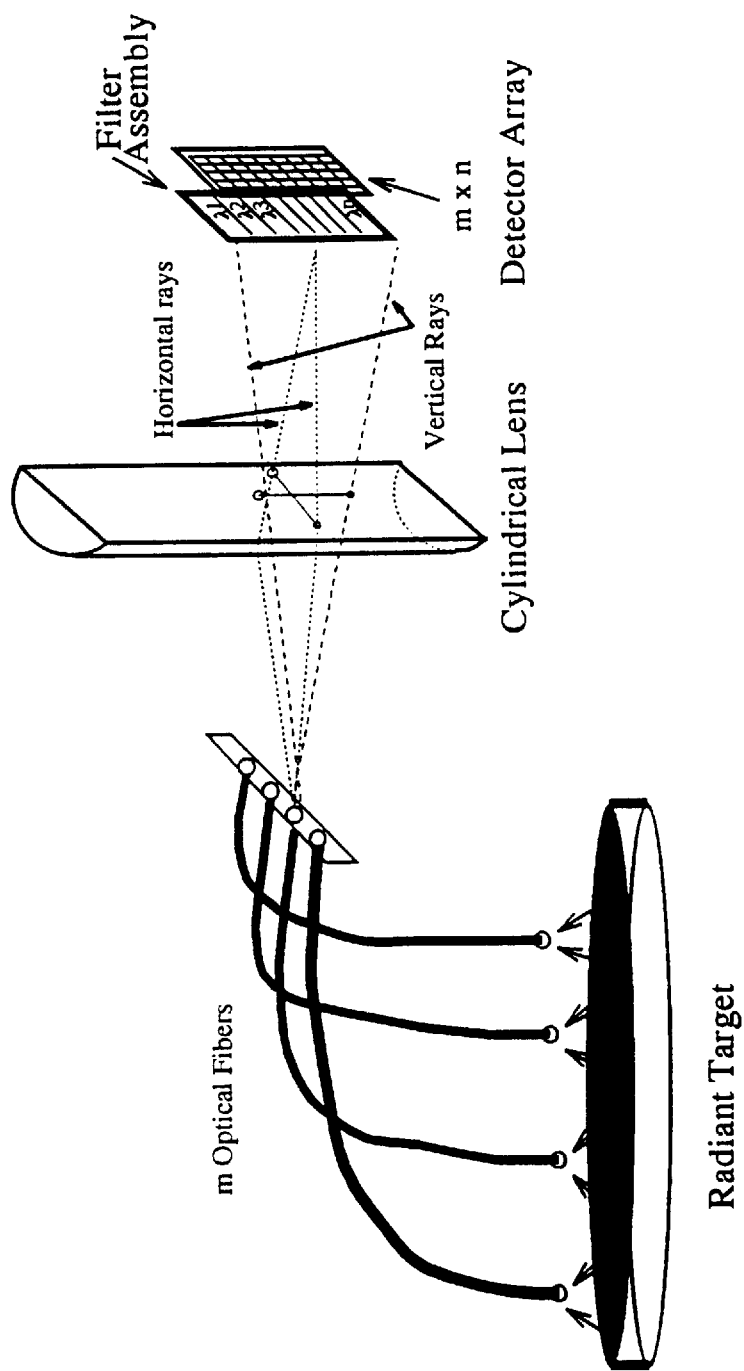
FIG. 6 illustrates fiber-optic assembly for sensing of temperature profiles in accordance with the invention on target obscured from the direct observation. This figure illustrates the case where m individual optical fibers are used to image m target points and wherein cylindrical optics is utilized to project the output of each of m fibers across an assembly of n striped optical filters in one direction and to refocus the image of each optical fiber on the m sets of photodetectors in another direction.

In still another embodiment m individual optical fibers equipped with radiation collecting optics are used to collect thermal radiation from m target points. A cylindrical optics is then utilized to project the output of m individual optical fibers across an assembly of n narrow-band striped optical filters in one direction and to refocus the image of each optical fiber on the m sets (columns) of photodetectors in another direction, as shown in FIG. 6.

Figure 7:
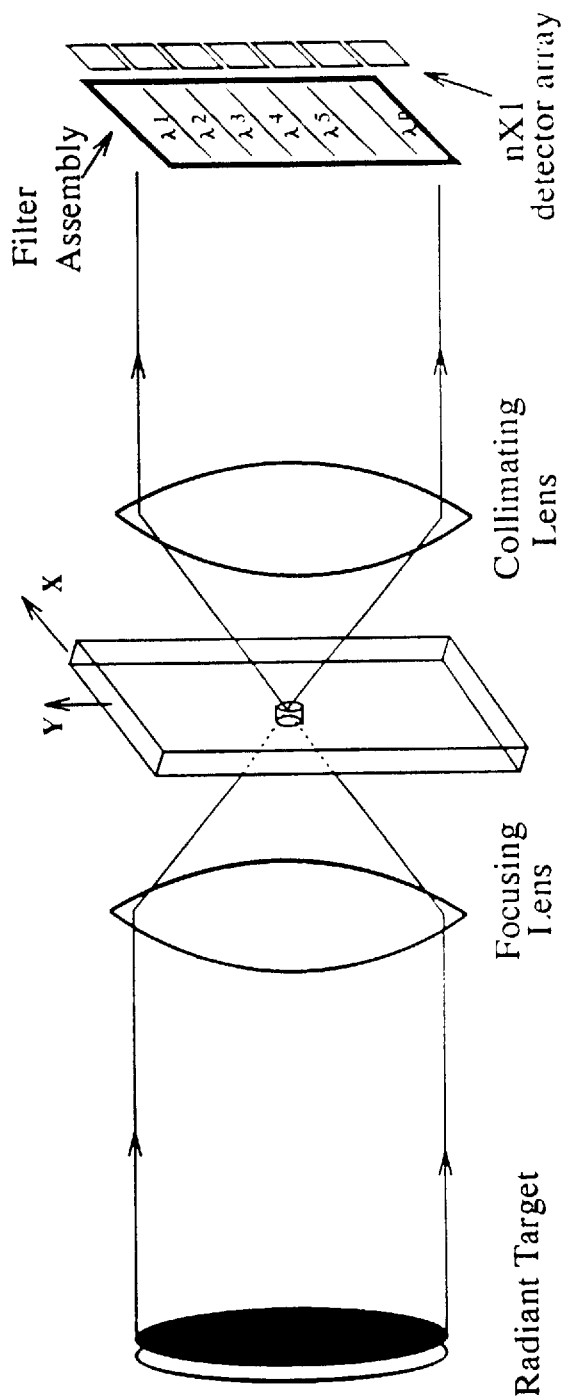
FIG. 7 illustrates the use of point aperture, collimating optics and one-dimensional filter and detector arrays for selectively scanning any point, line or area on a target by means of translation of the aperture in horizontal and vertical directions in accordance with the invention.
Figure 8:
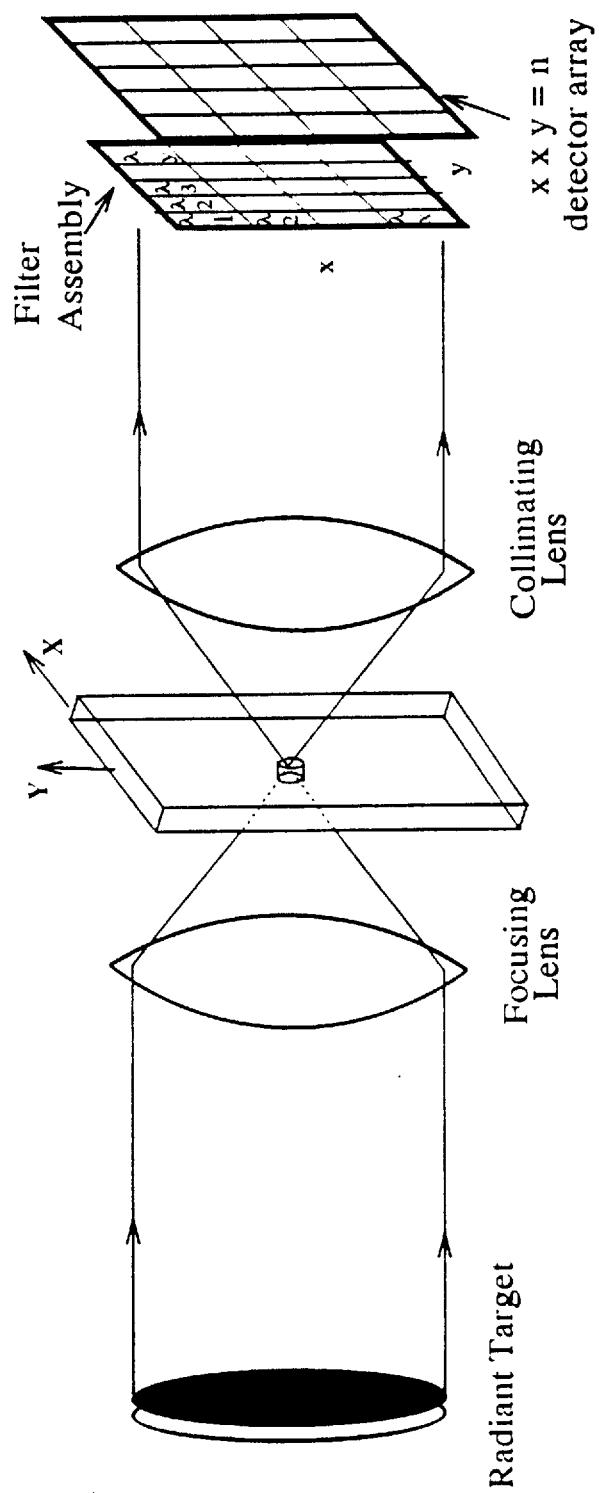
FIG. 8 illustrates the use of point aperture, collimating optics and two-dimensional filter and detector arrays for selectively scanning any point or area on a target by means of translation of the aperture in horizontal and vertical directions in accordance with the invention.

In yet another point-sensing embodiments of M-WIP the described above optical means for imaging the radiant target through an assembly of multiple narrow-band optical filters on an array of photodetectors are used in conjunction with one-dimensional array of n photodetectors instead of image sensor focal plane array. In this case as illustrated in FIG. 7 or FIG. 8 the image of the radiant target may be focused on a point aperture; the image of the target point defined by the aperture is then projected by the collimating optics on a line array of n photodetectors through n filters as shown in FIG. 7 or on a two-dimensional array of n photodetectors through a two-dimensional array of n optical filters, where the filter array is of the same size as the detector array and is in the close proximity to the detector array, as shown in FIG. 8. In another embodiment the slit is positioned on a uni-directional translation stage for line-scanning or on bi-directional translation stage for area scanning of target temperature profiles.

The Multi-Wavelength Imaging Pyrometer based on 7-filter "line-sensing" assembly was demonstrated at New Jersey Institute of Technology by the authors of the present invention.

The line-sensing filter assembly such as shown in FIG. 2A was employed in the demonstrated M-WIP system using f/1.4 spherical lens in order to focus the image of the radiant target on the narrow horizontal slit. The image of the target area defined by the slit aperture has been refocused on FPA in horizontal direction using cylindrical lens. As shown in FIG. 2A the image of the horizontal line on the target surface is "spread" across all M-WIP filters in vertical direction while preserving horizontal resolution.

This line-sensing filter assembly consists of seven filter stripes, 15×3 mm each. Two additional filters were positioned at the edges of the assembly to provide mounting borders. All filter stripes were epoxied together with inter-filter gaps painted by opaque material in order to eliminate the optical leakage and crosstalk.

In the demonstrated system, the central wavelengths, $\lambda_o$, of M-WIP IR filters ranging from 1790 nm to 4536 nm (at cryogenic temperature of 77K) correspond to the spectral sensitivity of the PtSi Schottky-barrier detectors (SBDs) used in the camera. As shown in Table 1, the bandwidths of the filters at half of peak transmission range from 51 nm for the 1790-nm filter to 102 nm for the 4536-nm filter.

The values of the peaks of the filter transmissions were individually attenuated in order to provide approximately equal detected signal at all wavelengths at target temperature corresponding to the middle of the expected temperature range of measurements. The attenuation of the IR filters in this manner partially compensates for the spectral variations in the detected signal levels and, therefore, reduces the requirements on the dynamic range of an IR sensor.

In the case of M-WIP system demonstrated at NJIT the values of the peaks of the filter transmissions were individually attenuated in order to provide approximately equal detected signal at all wavelengths for blackbody target at 700° C.

TABLE 1

Spectral characteristics of M-WIP filters (Optical Filter Corporation).

| | Prior to Attenuation | | | Subsequent to Attenuation | | | | |
|---|---|---|---|---|---|---|---|---|
| | Room Temperature | | | Room Temperature | | | 77 K. | |
| Filter No. | CW [nm] | BW [nm] | TR [%] | CW [nm] | BW [nm] | TR [%] | CW [nm] | BW [nm] |
| 1 | 1797 | 47 | 69 | 1803 | 49 | 14 | 1790 | 51 |
| 2 | 2189 | 55 | 82 | 2192 | 61 | 13 | 2180 | 64 |
| 3 | 2596 | 57 | 61 | 2595 | 58 | 12.5 | 2580 | 60 |
| 4 | 3180 | 44 | 66 | 3179 | 36 | 25 | 3158 | 38 |
| 5 | 3462 | 53 | 48 | 3467 | 57 | 35 | 3447 | 60 |
| 6 | 3993 | 73 | 33 | N/A | N/A | N/A | 3970 | 77 |
| 7 | 4512 | 106 | 79 | N/A | N/A | N/A | 4536 | 102 |

CW — Center Wavelength; BW — Bandwidth; TR — Peak Transmission

In the case of the M-WIP system demonstrated by the authors of this invention, the spectral scans of all filters prior and subsequent to attenuation were performed by Optical Filter Corp., Natick, Mass. (OFC) in order to verify the need for blocking of high order transmission peaks. Furthermore, the effects of cryogenic temperature (77K) on the spectral characteristics of the filters were investigated. As illustrated in Table 1, the thermal contraction of the filters at cryogenic temperature has the effect of increasing filter bandwidths by approximately 4% and decreasing the values of central wavelengths by about 1%.

In another embodiment of the present invention the image sensor is equipped with electronic control of optical integration time. The variable optical integration time allows to accommodate wide dynamic range of optical signals characteristic of pyrometric applications. In this embodiment the value of the optical integration time is digitally encoded in the video signal and is transmitted through the optoelectronically isolated channel to signal processing computer workstation.

An infrared CCD camera system was constructed to operate the Sarnoff (David Sarnoff Research Center, Princeton, N.J.) 320×244 Schottky-barrier IR-CCD Focal Plane Array (FPA) (see W. F. Kosonocky, "Review of Infrared Image Sensors with Schottky-Barrier," Mita Press, Tokyo, 1991) as a non-interlaced 320×122-element multi-wavelength imaging radiometer (M-WIP).

To achieve wide dynamic range required for M-WIP, the imager was operated in a non-interlaced format with variable optical integration times ranging from 120 $\mu$sec to 12 sec. Subframe integration time control was achieved by employing a double detector readout. To facilitate this operation, camera circuitry was developed for automatically controlling the CCD waveforms to operate at the required integration time. This imager was also operated in a multi-frame integration mode with a single detector readout for optical integration times in multiples of 33 ms. The analog video signal was digitized to 12-bits resolution. Circuits were also developed to embed critical information in the video signal to facilitate radiometric post-processing. An optoelectronically buffered digital interface was developed to connect the camera system to a DATACUBE image processing system hosted by SUN workstation.

Figure 9:
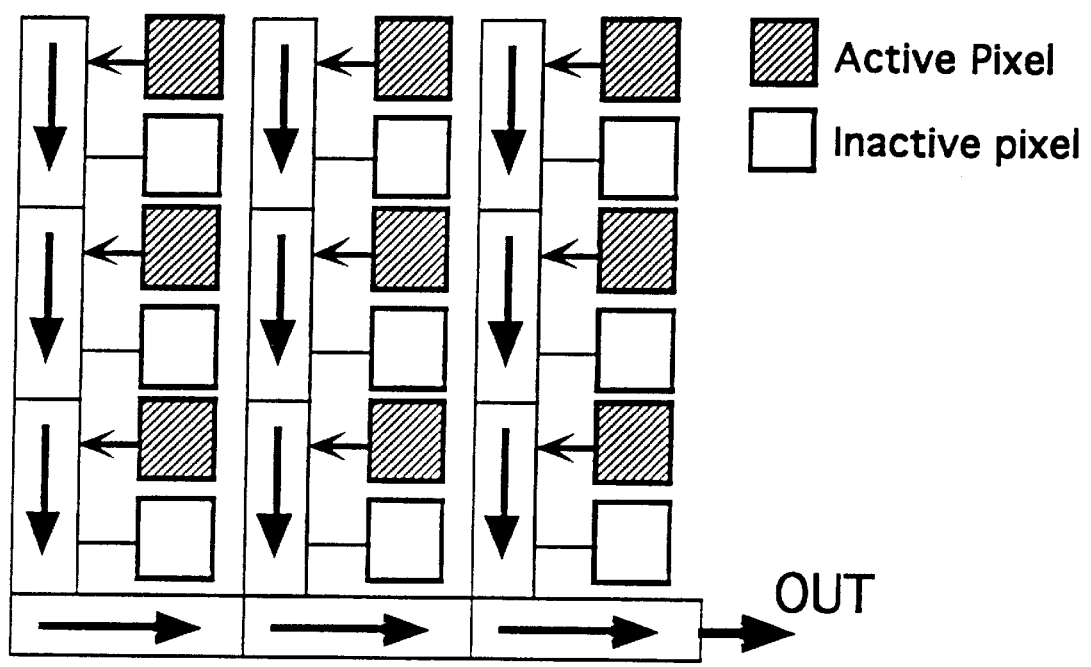
FIG. 9 illustrates schematic diagram of Sarnoff 320×122 non-interlaced PtSi Focal Plane Array (FPA) suitable for use in the invention.

The imager utilized in the demonstrated M-WIP system uses PtSi Schottky-barrier detectors (SBDs) (see W. F. Kosonocky, "State-of-the-Art in Schottky-Barrier IR Image Sensors," SPIE Proceedings, Vol. 1685-2, Orlando, Fla., 1992) with internal photoemission generating electrical charge proportional to the incident optical signal. The useful spectral bandwidth is from 1.5 to 5.5 $\mu$m. The camera is operated in a non-interlaced mode utilizing 122 vertical elements (single field) per frame. Shown in FIG. 9 is a representation of the imager geometry. Two vertically adjacent photodetectors share a common vertical transfer register CCD. By utilizing only one field, one detector is assigned to a vertical register. This charge is transferred downward at the rate of one register per line time (63.55 $\mu$s). At the bottom of these registers, a horizontal (C-register) clocks the charge out to an on-chip output amplifier at the photodetector rate.

The camera can operate with two choices of integration time control. For integration times less than 33 milliseconds, i.e. for sub-frame integration time, the imager is operated with a double SBD transfer per frame where the detectors are allowed to saturate until the first transfer pulse dumps this charge into the registers. After clearing this charge and integrating for a precisely controlled time, the second transfer pulse reads out the detected signal. Without a built-in drain to clear excess detected charge, this charge is swept out through the normal readout channels. During the sweep out procedure, signal charge is being integrated in the detectors. Therefore, to obtain short integration times, the dumped charge needs to be swept out in the shortest possible time. The sweep out procedure begins as the charge that has accumulated in the detectors from the last transfer pulse is transferred to the B-registers through a transfer pulse. The B-registers are then clocked rapidly and charge immediately saturates the C-registers that are simultaneously clearing charge through the output drain. The charge is cleared from the B-registers in two line times but three additional line times are required to clear the C-registers. The minimum sub-frame optical integration time available for this camera is two line times or 127 $\mu$s.

For integration times greater than or equal to 33 milliseconds, the camera operates with a single SBD transfer pulse per optical integration time. This mode will be referred to as the multi-frame integration mode. The multi-frame integration mode is used for imaging scenes of low temperature. In this case the reduction in the radiant flux causes a reduction in the amount of charge signal integrated over standard 33 ms operation. This decreases the signal to noise ratio and the response of the camera tends to deviate from linearity. To improve the radiometric performance, the optical integration time should be increased. This is accomplished by suppressing the SBD readout for a (N) number frames (while the imager operates at the frame rate of 30 frames/sec) but for every N frames only one frame contains the detected signal charge. For operation in multi-frame integration mode with integration time of 33 ms or multiples of 33 ms, the SBD are readout only once per optical integration time.

In the case of M-WIP system demonstrated by the authors, there are two separate units that comprise the total camera system, the camera head and the video processor box. The camera head electronics (with the exception of the custom sequencer board) have been built using the designs and printed circuit boards developed at the David Sarnoff Research Center. The camera head consists of four printed circuit boards affixed to the outside of a mini-sized liquid nitrogen dewar. Also affixed inside the dewar is the imager chip. The chip is placed in a vacuum chamber with a 2" silicon window to allow incident light to be imaged. The camera head electronics consists of Bias Board, Clock Generator or Variable Integration Sequencer, Analog Board, and Pre-Process Board.

The entire camera head measures 10.4×5.7×4.8 inches. The camera head is connected to the video processor by a 34-pin connector cable. The bias board is mounted rearmost and provides back panel access to all analog chip voltage levels set by potentiometers for calibration and adjustment. The analog board provides analog signal amplification and control for transmission to the video processor unit. Synchronization pulses provided by the clock board are added to the "raw" signal to provide a composite video signal. The pre-process board is located at the front of the dewar, near the imager chip. The board is shaped like a horseshoe to allow for the installation of the cold shield assembly. The board is connected to the imager chip via a 22 pin hermetically sealed gold connector. The connector provides electrical access to the vacuum chamber. The variable integration timing sequencer provides the proper clock cycles to operate the imager with any of the multiple integration time modes. This board receives a four-bit nibble representing the integration time suggested by the video processor box and automatically sequences the operations required to perform the dump and read procedure described in the previous chapter. There are four operating modes of the sequencer in any integration time: READOUT, DUMP, TRANSFER, and SWEEPOUT. The integration time is input to a differential receiver (SN75ALS193) and input to a XILINX (XC3042-PC84) field-programmable gate array (FPGA). The array provides pulses to the stand-alone microsequencer (SAM) to generate the proper transfer and CCD clock pulses to perform variable integration. The XILINX FPGA provides pulses DUMP, SWEEP, and TRANS to the Altera (EPS448) SAM. The SAM is user configurable and is a function-specific programmable state-machine. The internal EPROM memory allow up to 448 unique states to be specified and contains an internal clock and a pipeline register for high speed output state transition operation. By impressing a "1" to any of the three inputs, the SAM switches to one of three modes.

The video processor of the camera provides digital conversion and manipulation for signal processing. The video processor also provides feedback (either manual or automatic) to control the optical integration time. The main user interface is through the processor and the ports which connect the camera to other computing and control equipment is through the processor. The processor box contains all the power supplies necessary to run the processor and the camera head. The box measures 17×18×5.5 inches and contains a card cage with 10 slots to provide for adaptability and easy maintenance. PC-type edge connector cards with 102-pin Euro connectors are used and the card cage back plane is set up with the data stream running from left to right when viewed from the front. This means that the order that the cards are placed in the cage is critical. The video signal that arrives at the video processor port is in sampled analog form. The photodetectors are discrete packages of information in analog form streaming in at approximately 6 MHz. The video signal is digitized with 12-bit resolution by utilizing the Burr-Brown 10 MHz 12-bit A/D converter (ADC603H). The ADC converts analog signals with a full scale range of −1.25 to +1.25 volts. Therefore the data can assume 4096 discrete states with each state corresponding to a voltage change of 0.61 mV. This is the resolution of the converter board. A simulator board was designed for test purposes and resides in the same slot as the ADC board. By replacing the ADC board, the simulator board emulates a temporally and spatially noise-free digital photodetector stream. This board has two pattern generators and twelve 2:1 multiplexers to choose one of the two patterns. The patterns are generated from the control signals sent from the camera head (VA, HA, and CLOCK). The patterns simulate a horizontal ramp assuming all photodetector values and a set of sixteen horizontal bars of multi-line width. The board allows the evaluation of the digital noise generation in the video processor and allows for accurate linearity testing of processor components and computer interfaces.

The operation of the M-WIP system requires that the camera be able to respond quickly to changes in the input optical signal. To accomplish this, control of the optical integration time is performed digitally. The frame may be considered as a collection of 39040 photodetectors and the design of a robust control circuit for the integration time must be flexible. The control scheme compares the photodetector signals individually and then decides upon action after considering the state of the entire ensemble of photodetectors that make up the frame. The 12-bit digitized video signal is compared against preset levels to determine the state of the photodetector (too bright, too dark, or in range). Photodetectors that are out of range are counted and at the end of the frame, these counts are compared against user-set thresholds for bright and dark photodetector totals and this output is applied to a binary up/down counter providing a 4-bit code representing the integration time. Decoding circuitry prevents the integration time from exceeding the operating range 0–11 (0000–1011). The next frame's integration time is already set so that the decision to change integration time requires one frame time of latency.

The output of the camera system is transmitted to a host computer. Circuitry was developed to impress data crucial to properly processing the video data in the 3rd line of the active video signal. The information sent to the SUN-hosted DATACUBE image processing system is the optical integration time (4-bits) and the frame count (16-bits representing the experiment's elapsed time). This represents a total of 20-bits of data. The video data bus is 12-bits deep so the information was coded to fit on the data bus. The information is also repeated 80 times to insure that the radiometric information of the frame could be assured in the event that noise would corrupt photodetectors in the information line. This redundancy is synchronized by embedding flag bits between the information to facilitate detection.

The video signal with the encoded integration time and frame count are transmitted to a DATACUBE processor that is controlled by a SUN work station for video processing. The data were transmitted with optoisolation for power supply isolation. The optoisolator consists of a photodiode/Darlington phototransistor pair hermetically sealed in a hollow cavity 8-pin dual inline package. The inputs to the optoisolators are impedance matched to both the bus impedance and the frequency of operation. The resulting data are single ended TTL compatible signals. These signals are latched using 74LS374 Octal D-type flip flops to line them up in time. Tests were made with digital video test signals that determined the bit-error rate (BER) for the transmission and frame acquisition system to be less than $0.5 \times 10^{-6}$ errors/bit.

In another embodiment the computer workstation is adapted to apply to the detected signal the compensations for non-linearities of radiometric sensor response. In this embodiment the applied signal corrections include subtraction of the pre-stored background from the detected signal, subtraction of the dark current charge from the detected signal with photodetector-by-photodetector compensation for dark current variation as function of the detected signal level, compensation for responsivity variations, such as saturation-type non-linearity of radiometric sensor response based on the pre-stored characterization of this non-linearity as function of the detected signal level and the intensity of the incident radiative flux. In another embodiment of the present invention, the compensation for saturation-type non-linearity of radiometric sensor response is expressed as function of the detected signal only.

In the case of an M-WIP system based on an IR sensor with significant dark current levels (such as IR-CCD imager with PtSi Schottky-barrier detectors used in the demonstrated M-WIP system) both dark current and the responsivity of the IR sensor may depend on the level of the integrated charge signal.

In order to correct the detected signal for the dark current charge, the variation of the dark current with accumulated signal level can be estimated according to the following algorithm:

1. Using cold-shield to prevent radiative flux from reaching the detectors, the dark current charge is experimentally measured for the wide range of optical integration times. The dark current is then approximated by an exponential function of integration time, $t_{int}$, as:

$$S_{DC}^{measured} = ae^{bt_{int}} + c \tag{1}$$

A derivative of Eq. (1) with respect to optical integration time, $t_{int}$, represents the dark current which can be expressed as function of the accumulated signal:

$$I_{DC}(S_{DC}^{measured}) = I_{DC}(S) = \frac{\partial S_{DC}^{measured}}{\partial t_{int}} = b(S_{DC}^{measured} - c) = b(S - c) \tag{2}$$

where S represents the total accumulated charge regardless of its source.

2. The dark current component of the signal integrated by the imager viewing the radiant target can now be expressed as:

$$S_{DC}^{estimated}(T, t_{int}) = \tag{3}$$

$$\int_0^{t_{int}} I_{DC}(S(T, t_{int}))dt = \frac{b}{k_2}(S(T, t_{int}) - k_1 - k_3) + b(k_3 - c)t_{int}$$

where $S(T, t_{int}) = k_1 e^{k_2 t_{int}} + k_3$—is the detected signal approximated by the exponential function of optical integration time, $t_{int}$, and T is the temperature of the radiant target.

In another embodiment, the detected signal is approximated by linear function of optical integration time, $t_{int}$, that results in the following expression for the dark current component of the signal integrated by the imager viewing the radiant target:

$$S_{DC}^{estimated}(T, t_{int}) =$$ (3a)

$$\int_0^{t_{int}} I_{DC}(S(T, t_{int})) dt = \frac{b \cdot S(T, t_{int})}{k} \times \left( \frac{S(T, t_{int})}{2} - c \right)$$

where the detected signal is approximated as $S(T, t_{int}) = k \cdot t_{int}$.

The correction for saturation-type non-linearity is achieved according to the following algorithm:

1. Based on experimental signal measurements for a wide range of blackbody temperatures and values of the optical integration time the detected signal can be approximated by an exponential function of optical integration time, $t_{int}$, for each temperature, $T_i$, of the calibration source, as:

$$S^{detected} = a_1^i e^{a_2^i t_{int}} + a_3^i$$ (4)

2. For N various radiative fluxes corresponding to N various temperatures, $T_i$, of the calibration blackbody source the intensity of the incident on IR detectors radiative flux is characterized by the ratio of the detected signal, $S(T_i, t_{int})$, to the value of optical integration time, $t_{int}$, as:

$$F_i = \frac{S(T_i, t_{int})}{t_{int}}, i = 1, \ldots, N$$ (5)

The linearized and corrected for off-set at zero integration time signal can now be expressed as function of the detected signal and the intensity of the incident radiative flux as:

$$S^{linear} = \frac{\partial S^{detected}}{\partial t_{int}} \bigg|_0 \times t_{int} = a_1^k \cdot a_2^k \cdot t_{int} = a_1^k \cdot \ln\left( \frac{S^{detected} - a_3^k}{a_1^k} \right)$$ (6)

where index k is determined from the following condition (assuming that $F_k$ are sorted in the ascending order):

$$\frac{F_k + F_{k-1}}{2} < \frac{S^{detected}}{t_{int}} < \frac{F_k + F_{k+1}}{2}$$

In the demonstrated M-WIP system dark (leakage) current signal was measured as a function of time to determine the precise generation rate so that its contribution to the signal level can be suppressed. To shield the camera from IR radiation, the imager was masked with a square sheet of indium placed over the photosensitive area, with the sheet in thermal contact with the dewar cold finger. The integration time was varied by operating the camera in the normal full-frame (33 millisecond integration time) mode and suppressing an integer number of charge transfer pulses to allow the detectors to integrate charge for multiple frame times until the selected SBD transfer pulse is applied. The computer was synchronized to the active signal by gating the vertical sync signal to pass only after dark current charge was transferred to the CCD registers.

Figure 10A:
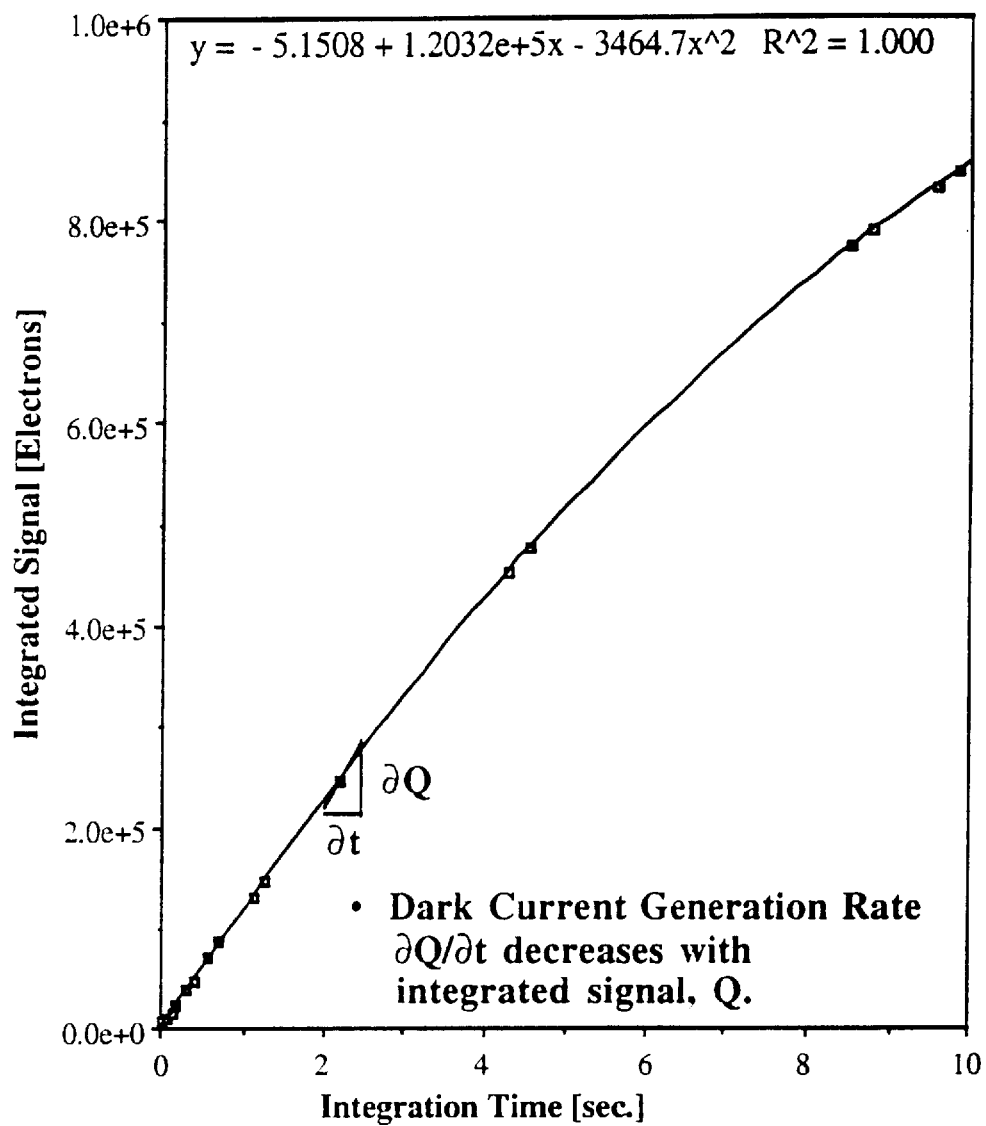
FIG. 10A illustrates the variation of the dark current as function of accumulated signal for PtSi FPA of FIG. 9.

Measurements were taken for various integration times greater than 66 milliseconds in increments of 33 milliseconds. Shown in FIG. 10A is the signal data versus integration time. It is seen from this figure that the generation rate decreases with extended integration time. From the acquired data, the generation rate, $\delta Q_{DC}/\partial t$ of the dark current charge $Q_{DC}$ was calculated as a function of accumulated charge signal level.

Figure 10B:
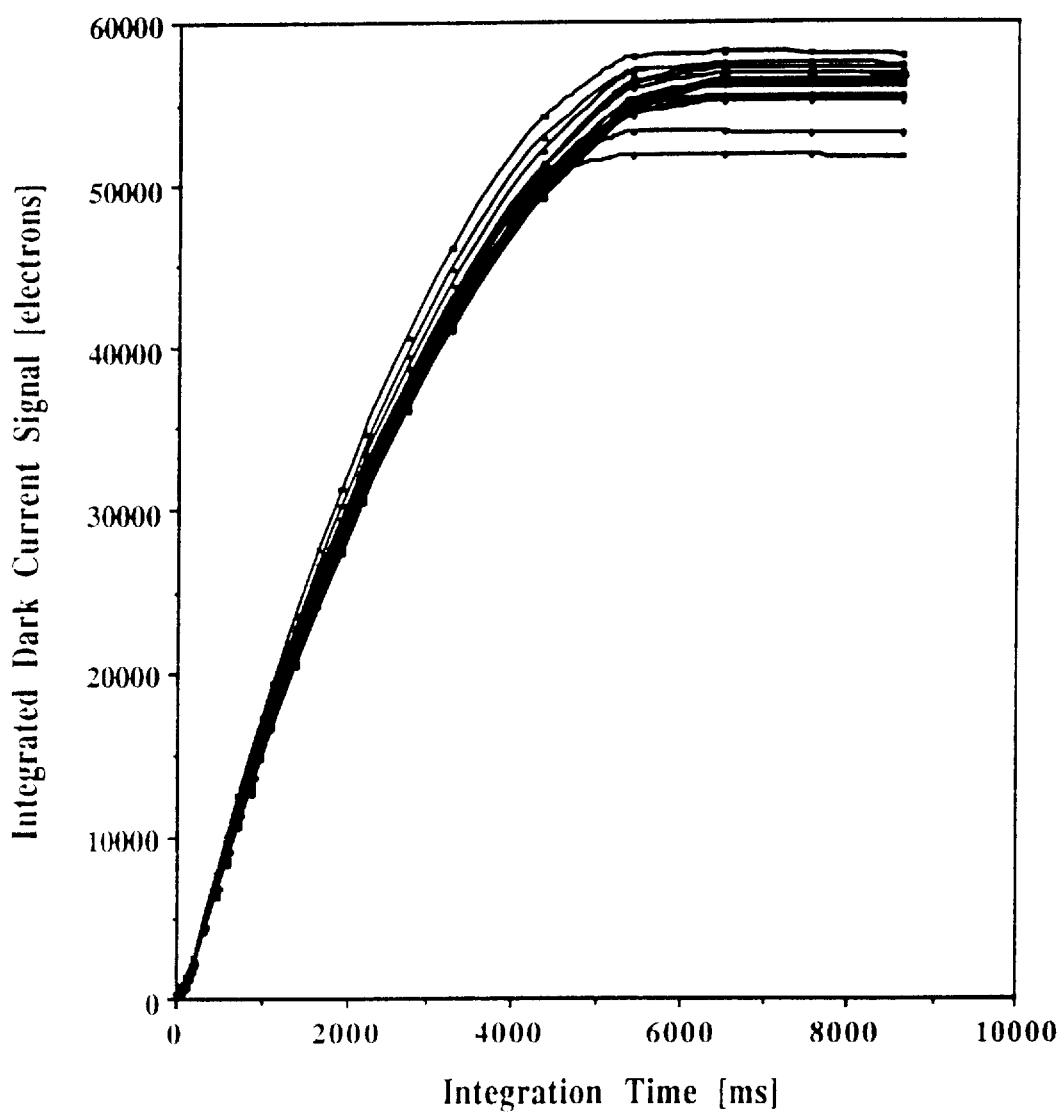
FIG. 10B illustrates dark current non-uniformity as measured at 20 representative pixels of PtSi FPA of FIG. 9.

Shown in FIG. 10B, is a plot of the dark current for twenty representative photodetectors versus integration time. Non-uniformities in the dark current generation rates from photodetector to photodetector, shown in this figure, led to a conclusion that the dark current linearity corrections need to be made for each photodetector individually.

In another embodiment the computer workstation is adapted to apply to the detected signal the compensation for low frequency variations in the power supply voltages which affect the long term stability of the camera response. In another embodiment the computer workstation is also adapted to perform temporal noise reduction by spatial and/or temporal averaging of the detected signal.

In the case of the demonstrated M-WIP system a black level subtraction has been introduced to correct for camera electronic offset and to perform signal stabilization. The black level has been obtained by sampling the signal during horizontal blanking when the C-register is still clocking but no signal is present (overscan). After the C-register removes any charge left behind, a steady state value is recorded. Values from several lines are recorded and a mean value is computed for each frame. This black level is then subtracted from each data point for that frame.

In another embodiment the following corrections and compensations are applied consecutively to the detected signal:

First, in order to reduce temporal noise in the detected signal, the signal values corresponding to the individual detectors (photodetectors) are averaged in time (over several video frames or readout cycles) and/or in space (over small subframe area). In addition, the long term signal stabilization is achieved by performing overscan (black level) subtraction using signal sampling during horizontal blanking time as described above.

Next, the accumulated dark current charge corresponding to the detected signal level and current value of the optical integration time is estimated from Eq. (3) based on the described above algorithm. The estimated dark current charge is then subtracted from the detected signal level.

Next, the correction for "saturation-type" non-linearity is applied according to Eq. (6), thus linearizing the detected signal with respect to the optical integration time.

The prestored background measured at each optical integration time, $t_{int}$, is subtracted from the detected signal, thus achieving "offset-type" correction.

Due to relatively low background levels, the dark current charge included in the subtracted background is assumed to be approximately equal to that measured in the absence of optical signal as given by Eq. (1). Based on Eq. (1) this dark current is evaluated for current value of the optical integration time and is added to the signal.

In another embodiment, the workstation is adapted for operation in two modes—system calibration and real-time temperature measurements. In the calibration mode the computer workstation is adapted to employ least-squares-based calibration algorithm designed for photodetector-by-photodetector evaluation of the effective values of peak transmissions ($\tau_0$) and center wavelengths ($\lambda_0$) of IR filters based on the detection of thermal radiation emitted by the pre-calibrated blackbody source over a wide range of source temperatures.

$$\min_{\tau_0,\lambda_0} \sum_{i=1}^{M} \left\{ \frac{1}{\sigma_i^2} [S_i - \tilde{S}(T_i^{BB},\tau_0,\lambda_0)]^2 \right\} \rightarrow \tau_0,\lambda_0 \quad (7)$$

where:

$S_i$—generated response at $T_i^{BB}$ for given filter—detector combination, $\tilde{S}(T_i^{BB},\tau_o,\lambda_o)$—radiometric model of sensor response at $T_i^{BB}$, corresponding to filter with peak transmission $\tau_o$ and center wavelength $\lambda_o$, $T_i^{BB}$—i-th temperature of the reference (blackbody) radiation source, $\sigma_i = \Delta S_i \approx \sqrt{S_i}$—rms signal noise (standard deviation of the response), In the temperature measurement mode the computer workstation is adapted for evaluation of temperature and emissivity profiles on the target based on the curve-fitting of the signals given by the radiometric model of an image sensor response to the values of target radiance measured at N distinct wavelength for each of the several spatial points on the target surface.

In its most general form, the least-squares minimization problem of M-WIP can be expressed as:

$$\min_{T,\epsilon} \chi^2 = \min_{T,\epsilon} \sum_{i=1}^{N} \left\{ \frac{1}{\sigma_i^2} [S_i - \tilde{S}(T,\epsilon,\lambda_i)]^2 \right\} \rightarrow T, \epsilon(\lambda) \quad (8)$$

where:

$S_i$—generated response to the radiant target imaged onto photodetector through narrow-band optical filter with center wavelength $\lambda_i$, $\tilde{S}(T, \epsilon, \lambda_i)$—radiometric model of sensor response to the radiant target imaged onto photodetector through narrow-band optical filter with center wavelength $\lambda_i$, T—temperature of radiant target, $\epsilon = \epsilon(\lambda)$—model of target spectral emissivity, $\sigma_i = \Delta S_i \approx \sqrt{S_i}$—rms signal noise (standard deviation of the response).

It might be noted that in the case of M-WIP, both Eqs. (7) and (8) call for minimization of the weighted sum of squares of differences between the theoretical and experimental values of the detected signal, where the points with higher values of the rms radiation shot noise are given less weight.

The radiometric model of an image sensor response consists of the product of two models: the model of an image sensor spectral response to the incident radiative flux times the model of the spectral radiance of the target surface. The model of an image sensor spectral response to the incident flux is given by the product of spectral responsivity of the sensor and the correction coefficient which depends on the effective transmission of the optical system, geometry of the detector, and the optical integration time. This correction coefficient is evaluated using developed by Coates (see P. B. Coates, "Wavelength Specification in Optical and Photoelectric Pyrometry," Metrologia, 13, 1, 1977) reference wavelength method based on the description of the spectral transmission of narrow-bandpass filter in terms of the moments of its spectral transmittance about the reference (mean or center) wavelength of the filter. The model of the spectral radiance of the target is given by the product of the radiance of the blackbody radiator (described by the Planck's equation) and the model of the spectral emissivity of the target.

Taking into consideration the spectral responsivity of the photodetector, $R(\lambda)$, and the effective transmission, $\tau(\lambda)$, of the optical system, the signal detected by the sensor viewing the radiant target (in electrons per photodetector) is given by:

$$S(T) = A_{d,n} \cdot \frac{\pi}{4 \cdot (f/\#)^2} \cdot \frac{t_i}{Q_{e1}} \cdot \int_0^\infty \epsilon(\lambda) \cdot \tau(\lambda) \cdot R(\lambda) \cdot L_{\lambda,b}(\lambda,T) d\lambda \quad (9)$$

where $t_{int}$ is the optical integration time in seconds; $Q_{e1} = 1.6 \times 10^{-19}$ is the charge of the electron [Coulomb]; $A_{d,n}$ is the area of projection of the detector aperture onto a plane perpendicular to the optical axis [m²]; $\epsilon(\lambda,T)$ is the spectral emissivity of the target; $L_{\lambda,b}(\lambda,T)$ is the blackbody spectral radiance [W/m² $\mu$m]; and $\omega_d \approx \pi/(4(f/\#)^2)$ is the solid angular field of view determined by the aperture.

Following the development by Coates we define the $n^{th}$ moment of the transmittance, $a_n$, by $$\int_0^\infty (\lambda - \lambda_o)^n \cdot \tau(\lambda) d\lambda = a_n \cdot \tau(\lambda_o) \cdot (\Delta\lambda)^{n+1} \quad (10)$$

where $\Delta\lambda$—is the bandwidth of the filter at half of its peak transmittance.

It can be noted that the moments reflect the shape of the filter and are independent of the peak transmission, $\tau_O$, and the filter width $\Delta\lambda$. Since the reference wavelength, $\lambda_O$, is taken as the mean wavelength of the filter, the first moment, $a_1$, is zero by definition.

The output signal of the IR imager viewing radiant target with temperature T and spectral emissivity $\epsilon(\lambda)$ can now be described to a good first approximation by:

$$S_o(T) = A_{d,n} \cdot \omega_d \cdot a_o \cdot \tau(\lambda_o) \cdot \Delta\lambda \cdot R(\lambda_o) \cdot \epsilon(\lambda_o) \cdot L_{\lambda,b}(\lambda_o,T) \quad (11)$$

where the factor $a_O$ has been included to make the product $a_o \tau(\lambda_o) \Delta\lambda$ equal to the area under the $\tau(\lambda)$ curve. We now define the correction factor C(T) as $$C(T) = \frac{S(T)}{S_o(T)} = \int_0^\infty \frac{\tau(\lambda)}{a_o \tau(\lambda_o) \Delta\lambda} \cdot \frac{R(\lambda)}{R(\lambda_o)} \cdot \frac{\epsilon(\lambda)}{\epsilon(\lambda_o)} \cdot \frac{L_{\lambda,b}(\lambda,T)}{L_{\lambda,b}(\lambda_o,T)} \cdot d\lambda \quad (12)$$

Once the correction factor C(T) has been determined, the signal S(T) can be obtained from the computed signal $S_O(T)$. Each of the factors in the integrand, except that involving the filter transmission, is now expanded in a Taylor series about reference wavelength $\lambda_O$ $$\frac{R(\lambda)}{R(\lambda_o)} = 1 + r_1 \cdot (\lambda - \lambda_o) + r_2 \cdot (\lambda - \lambda_o)^2 + \ldots \quad (13)$$

$$\frac{\epsilon(\lambda)}{\epsilon(\lambda_o)} = 1 + \epsilon_1 \cdot (\lambda - \lambda_o) + \epsilon_2 \cdot (\lambda - \lambda_o)^2 + \ldots \quad (14)$$

and $$\frac{L_{\lambda,b}(\lambda,T)}{L_{\lambda,b}(\lambda_o,T)} = 1 + L_1 \cdot (\lambda - \lambda_o) + L_2 \cdot (\lambda - \lambda_o)^2 + \ldots \quad (15)$$

where $$r_n = \frac{1}{n! R(\lambda_o)} \cdot \frac{d^n R(\lambda)}{d\lambda^n} \quad (16)$$

$$\epsilon_n = \frac{1}{n! \epsilon(\lambda_o)} \cdot \frac{d^n \epsilon(\lambda)}{d\lambda^n} \quad (17)$$

and $$L_n(T) = \frac{1}{n! L_{\lambda,b}(\lambda_o,T)} \cdot \frac{d^n L_{\lambda,b}(\lambda,T)}{d\lambda^n} \quad (18)$$

Expressions for $L_1(T)$ and $L_2(T)$ can be obtained by differentiating the Planck's distribution function to find $$\lambda_o \cdot L_1(T) = \frac{xe^x}{(e^x-1)} - 5 \tag{19}$$

$$\lambda_o^2 \cdot L_2(T) = \frac{x^2 e^x}{(e^x-1)^2} + \frac{[(x^2/2) - 6x] \cdot e^x}{(e^x-1)} + 15 \tag{20}$$

where $$x = \frac{C_2}{\lambda_o T} \tag{21}$$

The computations performed for Gaussian filter with fractional bandwidth $\Delta\lambda/\lambda_O = 0.05$ and target temperatures between 100° C. and 1000° C. show that $L_3(T)$ and $L_4(T)$ enter only those terms of $C(T)$ which constitute less than 0.49% of its absolute value. Therefore, $L_3(T)$ and $L_4(T)$ can be sufficiently accurately evaluated by using Wien's law $$\lambda_o^3 \cdot L_3(T) = \frac{x^3}{6} - \frac{7x^2}{2} + 21x - 35 \tag{22}$$

$$\lambda_o^4 \cdot L_4(T) = \frac{x^4}{24} - \frac{4x^3}{3} + 14x^2 - 56x + 70 \tag{23}$$

The Eqs. (16) through (23) are now substituted into Eqs. (13), (14), and (15), and those expressions are in turn substituted into Eq. (12). After the substitution is performed the coefficients of each order of the terms $[(\lambda - \lambda_O)/\lambda_O]^n$ are collected. Designating the sum of the coefficients of the term of degree n as $\Sigma_n(T)$ we can express the correction factor as $$C(T) = 1 + \Sigma_1(T) \int_0^\infty \frac{(\lambda - \lambda_o)\tau(\lambda)d\lambda}{a_o\tau(\lambda_o)\lambda_o\Delta\lambda} + \tag{24}$$

$$\Sigma_2(T) \int_0^\infty \frac{(\lambda - \lambda_o)^2 \tau(\lambda) d\lambda}{a_o \tau(\lambda_o)\lambda_o^2 \Delta\lambda} + \ldots$$

Substituting from Eq. (19) into Eq. (24) we obtain $$C(T) = 1 + \Sigma_2(T) \cdot A_2 \cdot \left(\frac{\Delta\lambda}{\lambda_o}\right)^2 + \ldots + \tag{25}$$

$$\Sigma_n(T) \cdot A_n \cdot \left(\frac{\Delta\lambda}{\lambda_o}\right)^n + \ldots$$

where $A_n = a_n/a_O$ and $A_1 = 0$ since $a_1 = 0$ by definition.

In most practical cases $\epsilon(\lambda)$ and $R(\lambda)$ change relatively slow across the passband of the filter and can be accurately represented by the first three terms in Eqs. (13) and (14). Under these conditions the expressions for $\Sigma_n(T)$ up to $\Sigma_4(T)$ are found to be as follows $$\Sigma_1(T) = \lambda_o[L_1(T) + (r_1 + \epsilon_1)] \tag{26}$$

$$\Sigma_2(T) = \lambda_o^2 \cdot [L_2(T) + (r_1 + \epsilon_1) \cdot L_1(T) + (r_2 + r_1\epsilon_1 + \epsilon_2)]$$

$$\Sigma_3(T) = \lambda_o^3 \cdot [L_3(T) + (r_1 + \epsilon_1) \cdot L_2(T) + (r_2 + r_1\epsilon_1 + \epsilon_2) \cdot L_1(T) +$$

$$(r_3 + r_2\epsilon_1 + r_1\epsilon_2 + \epsilon_3)]$$

$$\Sigma_4(T) = \lambda_o^4 \cdot [L_4(T) + (r_1 + \epsilon_1) \cdot L_3(T) + (r_2 + r_1\epsilon_1 + \epsilon_2) \cdot L_2(T) +$$

$$(r_3 + r_2\epsilon_1 + r_1\epsilon_2 + \epsilon_3) \cdot L_1(T) + (r_4 + r_3\epsilon_1 + r_2\epsilon_2 + r_2\epsilon_3 + \epsilon_4)]$$

It may be noted that in the case of symmetrical filters, An is zero for odd values of n. Therefore, for symmetrical filters with moderate bandwidths, the third term in Eq. (25) is zero. For filters with $\Delta\lambda/\lambda_O < 0.1$ the fourth term in Eq. (25) is at least two orders of magnitude smaller than the second term. In this case the correction factor C(T) can be approximated by $$C(T) = 1 + \Sigma_2(T) \cdot A_2 \cdot \left(\frac{\Delta\lambda}{\lambda_o}\right)^2 \tag{27}$$

Substituting C(T) from Eq. (27) into Eq. (12) we obtain the expression for the output signal of the imager viewing the radiant surface through the narrow-passband filter $$S(T) = A_{d,n} \cdot \omega_d \cdot a_o \cdot \tau(\lambda_o) \cdot \Delta\lambda \cdot R(\lambda_o) \cdot \epsilon(\lambda_o) \times \tag{28}$$

$$\left[1 + \Sigma_2(T) \cdot A_2 \cdot \left(\frac{\Delta\lambda}{\lambda_o}\right)^2\right] \cdot L_{\lambda,b}(\lambda_o, T)$$

In order to further simplify the expression (28) we define the filter shape factor $K(\lambda_O, T)$ as $$K(\lambda,T) = A_{d,n} \cdot \omega_d \cdot a_o \cdot \tau(\lambda_o) \cdot \Delta\lambda \cdot \left[1 + \Sigma_2(T) \cdot A_2 \cdot \left(\frac{\Delta\lambda}{\lambda_o}\right)^2\right] \tag{29}$$

$$= G \cdot \left[1 + \Sigma_2(T) \cdot A_2 \cdot \left(\frac{\Delta\lambda}{\lambda_o}\right)^2\right]$$

where the geometric factor G is given by $$G = A_{d,n} \cdot \omega_d \cdot a_o \cdot \tau(\lambda_o) \cdot \Delta\lambda \tag{30}$$

Finally, substituting Eq. (3–27) into Eq.(3–26) we obtain the simplified expression for the output signal of the sensor $$S(\lambda,T) = K(\lambda,T) \cdot \epsilon(\lambda) \cdot R(\lambda) \cdot L_{\lambda,b}(\lambda,T) \tag{31}$$

Figure 11:
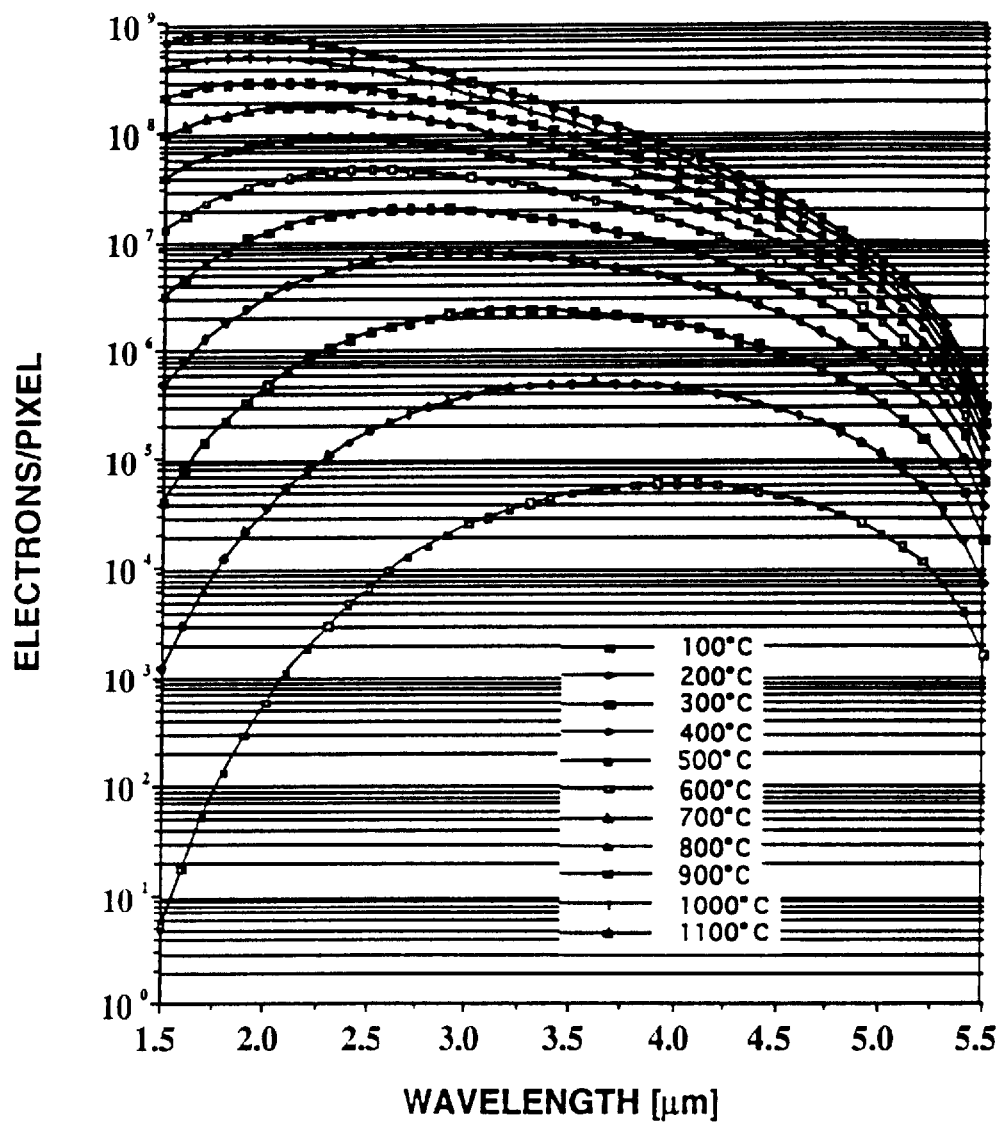
FIG. 11 illustrates the spectral signal simulated for a wide range of target temperatures using radiometric model of the PtSi IR-CCD FPA of FIG. 9 operating with optical integration time of 33 ms, f/2 optics, and a wide range of 20-nm-wide Gaussian filters.

The values of the output signal calculated from Eq. (31) for 320×244 IR-CCD camera operating with optical integration time of 33 ms, f/2 optics, and a 20-nm-wide Gaussian filter was calculated for broad range of temperatures and is shown in FIG. 11.

In another embodiment the model of the target spectral emissivity is given by a simple function of wavelength such as polynomial or exponential functions. In this embodiment, a number of pre-programmed emissivity models are considered at the beginning of the temperature measurement stage with final selection performed by so adapted computer workstation based on the quality of the fits of the radiometric models of an imager system (using emissivity models under consideration) to the experimental data (detected signals). In another embodiment, the particular selection of the spectral emissivity model is based on the available information about the target spectral emissivity.

In another embodiment the computer workstation represents multiprocessor system and is adapted for parallel signal processing. In this embodiment the least-squares-based evaluation of the temperature and emissivity at each point on the target surface is performed in parallel, thus increasing the speed of response of multi-wavelength imaging pyrometer.

In another embodiment the single-processor computer workstation is used and temperature and emissivity at each point on the wafer surface are evaluated on a point-by-point basis consecutively.

In another embodiment the continuous temperature and emissivity profiles on the target surface are determined using interpolation techniques based on the temperature and emissivity actually evaluated by curve-fitting for several points on the target surface. In the another embodiment the partial differential heat balance equation (describing radiative and conductive heat exchange within the target) is used to approximate the target temperature and emissivity for points at which these parameters were not directly evaluated based on least-squares fit. In another embodiment the polynomial interpolation is used for evaluation of continuous temperature and emissivity profiles.

In the another embodiment, as it relates to M-WIP computations, the high speed real-time M-WIP temperature measurements are achieved by taking into account the past dynamics of the target temperature and emissivity estimated from the previous measurements. In this embodiment the acceleration of M-WIP computations is achieved by periodically substituting the least-squares-based estimation of the target spectral emissivity with its prediction based on the past dynamics. Using thus predicted emissivity values the target temperature is directly computed from single-wavelength measurement using the radiometric model of IR sensor response. Using past dynamics and subjecting only the limited number of points on the target surface to the actual least-squares-based M-WIP estimate, this embodiment yields fast multi-point estimates of target temperature and emissivity profiles.

A seven-filter M-WIP system demonstrated by the authors of this invention was calibrated according to Eq. (7) against a reference blackbody source over a temperature range from 450° C. to 900° C. Based on this calibration, the real-time temperature resolution $\Delta T$ of $\pm 1°$ C. was demonstrated for blackbody target over temperature range from 600° C. to 900° C.

What we claim is:

1. Apparatus for non-contact measurements of temperature and emissivity profiles of a radiant target with unknown spectral emissivity comprising:

an assembly of "N" multiple narrow-band optical filters, where "N" is an integer greater than 2;

an array of photodetectors sensitive to the transmission bands of the optical filters;

optical means for imaging the radiant target through said assembly of "N" multiple narrow-band optical filters onto said array of photodetectors for producing multi-wavelength images of the radiant target onto said array of photodetectors sensitive to the transmission bands of the optical filters; and means for processing the detected multi-wavelength images of the radiant target using a model of the radiant target for determining the temperature and emissivity profiles on the surface of the radiant target.

2. Apparatus as claimed in claim 1 wherein said means for processing the detected multi-wavelength images of the radiant target represents a multiprocessor system and is adapted for evaluation of the temperature and emissivity at several points on the target in parallel.

3. The apparatus as claimed in claim 1 wherein said optical means, said optical filters and said array of photodetectors include means for imaging onto the array of photodetectors "m" spatially distinct points from said radiant target, where "m" is an integer greater than zero.

4. The apparatus as claimed in claim 3 wherein said "m" spatially distinct points are positioned along a line on the radiant target to be measured.

5. The apparatus as claimed in claim 3 wherein said "m" spatially distinct points form a two dimensional array on the radiant target.

6. The apparatus as claimed in claim 4 wherein said optical means and said optical filters include a line-sensing multi-wavelength filter assembly and optics comprising:

an assembly of striped narrow-band optical filters positioned in close proximity to said array of photodetectors;

an optical slit;

optical system for focusing the image of said line of "m" points of the radiant target to be measured on said optical slit; and an optical system for refocusing the image of the target area defined by the slit on said array of photodetectors through said assembly of striped (i.e. line) filters.

7. The apparatus as claimed in claim 6 wherein said optical system for focusing the image of said line of "m" points of the radiant target to be measured on said optical slit is comprised of spherical optics.

8. The apparatus as claimed in claim 6 wherein said optical system for refocusing the image of the target area defined by the slit on said array of photodetectors through an assembly of striped (i.e. line) filters includes cylindrical optics.

9. The apparatus as claimed in claim 6 wherein a relay lens system is used between said assembly of optical filters and said array of photodetectors.

10. The apparatus as claimed in claim 8 wherein two cylindrical lenses are used to magnify said line image of the target area defined by the slit and to project it on said assembly of striped filters.

11. The apparatus as claimed in claim 3 wherein said assembly of multiple narrow-band optical filters is in the form of a rotating filter wheel wherein the radiant target is imaged on said array of photodetectors sequentially through each optical filter, one filter at a time, allowing two-dimensional sensing of temperature and emissivity profiles of the radiant target.

12. The apparatus as claimed in claim 3 wherein said assembly of narrow-band optical filters comprises a number "m" of sets of optical filters, wherein each set of optical filters comprises "N" distinct narrow-band optical filters, where "N" is an integer greater than two.

13. The apparatus as claimed in claim 12 wherein said sets of optical filters form a two-dimensional array.

14. The apparatus as claimed in claim 12 wherein said optical filters and array of photodetectors are in close proximity to each other.

15. The apparatus as claimed in claim 12 wherein said optical filters and array of photodetectors are coupled by means of relay optics.

16. The apparatus as claimed in claim 1 wherein said optical means, said optical filters and said array of photodetectors includes means for imaging onto the array of photodetectors "m" spatially distinct points from said radiant target; wherein "m" is an integer greater than zero; and wherein said optical means for imaging the radiant target through said assembly of multiple narrow-band optical filters onto said array of photodetectors includes a fiber-optic assembly.

17. The apparatus as claimed in claim 16 wherein said optical means for imaging the radiant target through said assembly of multiple narrow-band optical filters on said array of photodetectors includes a number "m" of fiber-optic bundles, where each fiber-optic bundle comprises a number "n" of optical fibers, where each fiber-bundle transmits thermal radiation from one of "m" points on the radiant target to one of said "N" optical filters, where one fiber transmits radiation to one optical filter.

18. The apparatus as claimed in claim 16 wherein said optical means for imaging the radiant target through said assembly of multiple narrow-band optical filters on said array of photodetectors includes a number "m" of optical fibers, where each optical fiber transmits thermal radiation from one of "m" points on the radiant target to all of said optical filters by means of an optical lens system.

19. The apparatus as claimed in claim 18 wherein said optical lens system for imaging said "m" points on the radiant target on said array of photodetectors includes a cylindrical lens system that refocuses the transmitted thermal radiation from the output of said "m" optical fibers on said array of photodetectors through said narrow-band optical filters.

20. The apparatus as claimed in claim 1 wherein said narrow-band optical filters are attenuated, where the amount of attenuation provides for the fluxes of thermal radiation transmitted through each optical filter to be approximately equal to each other for radiant target temperature corresponding to the middle of the expected temperature range of said non-contact temperature measurements.

21. The apparatus as claimed in claim 1 wherein said array of photodetectors is equipped with means for electronic control of the duration of the optical integration time.

22. The apparatus as claimed in claim 21 wherein the value of the optical integration time is encoded in the output of an array of photodetectors.

* * * * *